United States Patent
Nagasawa

(10) Patent No.: US 10,363,870 B2
(45) Date of Patent: Jul. 30, 2019

(54) PASSENGER WAKE-UP APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/992,854

(22) Filed: May 30, 2018

(65) Prior Publication Data

US 2019/0100138 A1   Apr. 4, 2019

(30) Foreign Application Priority Data

Sep. 29, 2017   (JP) .................................. 2017-190788

(51) Int. Cl.
| | |
|---|---|
| *B60Q 9/00* | (2006.01) |
| *B60W 40/08* | (2012.01) |
| *G05D 1/00* | (2006.01) |
| *G05D 1/02* | (2006.01) |

(52) U.S. Cl.
CPC .............. *B60Q 9/00* (2013.01); *B60W 40/08* (2013.01); *G05D 1/0061* (2013.01); *G05D 1/021* (2013.01)

(58) Field of Classification Search
CPC ......... B60Q 9/00; G05D 1/0061; G05D 1/021
See application file for complete search history.

(56) References Cited

U.S. PATENT DOCUMENTS

| | | | |
|---|---|---|---|
| 2008/0276752 A1* | 11/2008 | Mo ....................... | G05G 1/506 74/560 |
| 2008/0283372 A1* | 11/2008 | Lee ...................... | B60K 26/021 200/61.89 |
| 2012/0042744 A1* | 2/2012 | Han ..................... | G05G 1/445 74/513 |
| 2013/0226408 A1* | 8/2013 | Fung .................... | B60W 40/09 701/41 |

(Continued)

FOREIGN PATENT DOCUMENTS

| | | |
|---|---|---|
| JP | 2008-197821 A | 8/2008 |
| JP | 2009-251973 A | 10/2009 |

(Continued)

OTHER PUBLICATIONS

Office Action dated Apr. 16, 2019 for Japanese Patent Application No. 2017-190788 (4 pages in Japanese with English translation).

*Primary Examiner* — Jack K Wang
(74) *Attorney, Agent, or Firm* — Smith, Gambrell & Russell, LLP

(57) ABSTRACT

A passenger wake-up apparatus for use in a vehicle includes a detector configured to detect a state of a passenger and being capable of automated driving control or driving support control based on a result of detection by the detector. The passenger wake-up apparatus includes a rest on which the passenger can put a foot, and a driving unit configured to be able to move the rest. When determining that there is a decrease in a level of wakefulness of the passenger based on the result of the detection by the detector, the driving unit moves the rest to push the foot of the passenger, while the automated driving control or the driving support control of the vehicle is performed.

16 Claims, 3 Drawing Sheets

(56) References Cited

U.S. PATENT DOCUMENTS

| | | | |
|---|---|---|---|
| 2014/0311278 A1* | 10/2014 | Min | G05G 1/40 |
| | | | 74/513 |
| 2014/0316647 A1* | 10/2014 | Min | G05G 1/40 |
| | | | 701/36 |
| 2014/0316649 A1* | 10/2014 | Min | B60K 26/021 |
| | | | 701/36 |
| 2014/0345415 A1* | 11/2014 | Kim | G05G 1/44 |
| | | | 74/513 |
| 2015/0160682 A1* | 6/2015 | Min | G05G 1/40 |
| | | | 74/513 |
| 2017/0334313 A1* | 11/2017 | Ahn | B60N 2/01 |
| 2018/0037236 A1* | 2/2018 | Yamaguchi | B60N 2/90 |
| 2018/0215272 A1* | 8/2018 | Vitullo | B60L 58/12 |
| 2018/0319279 A1 | 11/2018 | Ikeda et al. | |

FOREIGN PATENT DOCUMENTS

| | | |
|---|---|---|
| JP | 2010-172541 A | 8/2010 |
| JP | 2011-115450 A | 6/2011 |
| JP | 2017-134512 A | 8/2017 |
| WO | 2017/158758 A1 | 9/2017 |

* cited by examiner

PASSENGER WAKE-UP APPARATUS

CROSS-REFERENCE TO RELATED APPLICATIONS

The present application claims priority from Japanese Patent Application No. 2017-190788 filed on Sep. 29, 2017, the entire contents of which are hereby incorporated by reference.

BACKGROUND

1. Technical Field

The present invention relates to a passenger wake-up apparatus, more specifically to a passenger wake-up apparatus capable of reliably wakening a passenger with a simpler configuration than ever.

2. Related Art

There is disclosed an apparatus capable of determining an inattentive state of a passenger, for example, in Japanese Unexamined Patent Application Publication (JP-A) No. 2011-115450. This apparatus can determine whether the passenger inattentively drives based on the direction of the eye movement of the passenger. There is also disclosed a doze warning apparatus that gives a warning to a passenger who is driving inattentively or driving with a decrease in the level of wakefulness, for example, in JP-A No. 2008-197821. This apparatus promotes the wakefulness of the passenger by moving a seat or rotating a steering by the vehicle side.

SUMMARY OF THE INVENTION

An aspect of the present invention provides a passenger wake-up apparatus for use in a vehicle including a detector configured to detect a state of a passenger and being capable of automated driving control or driving support control based on a result of detection by the detector. The passenger wake-up apparatus includes a rest on which the passenger can put a foot, and a driving unit configured to be able to move the rest. When determining that there is a decrease in a level of wakefulness of the passenger on a basis of a result of the detection by the detector, the driving unit moves the rest to push the foot of the passenger, while the automated driving control or the driving support control of the vehicle is performed.

DETAILED DESCRIPTION

Figure 1:
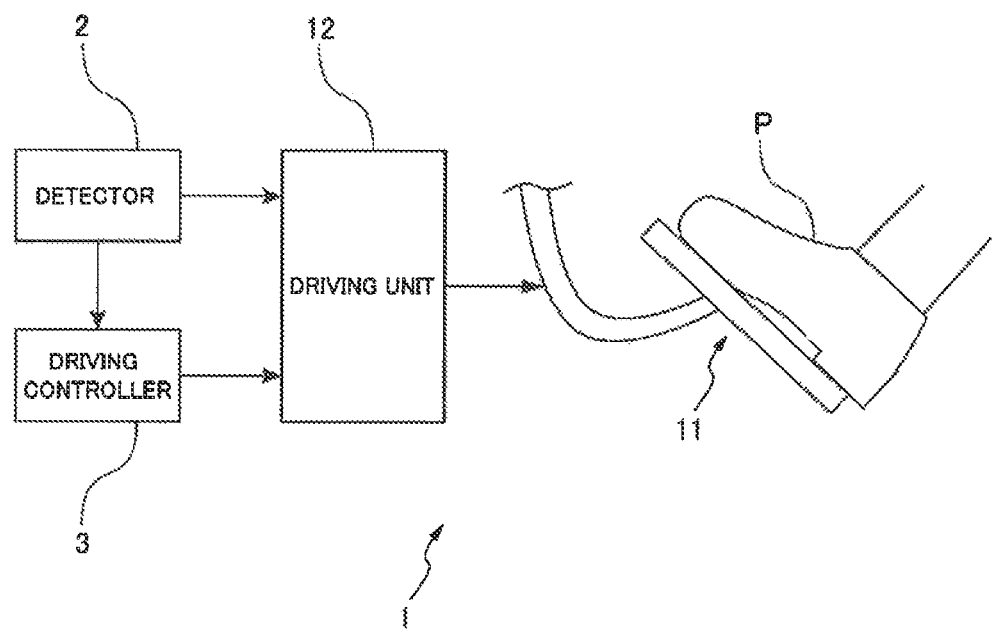
FIG. 1 is a schematic view illustrating a passenger wake-up apparatus according to an example of the present invention.

The passenger wake-up apparatus according to the present invention is applicable to a vehicle capable of automated driving control or driving support control. Hereinafter, an example of the passenger wake-up apparatus according to the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

An apparatus that promotes the wakefulness of the passenger needs to have a large-scaled and complex structure or system in a seat or a steering.

It is desirable to provide a passenger wake-up apparatus capable of reliably wakening a passenger with a simpler configuration than ever.

Figure 2:
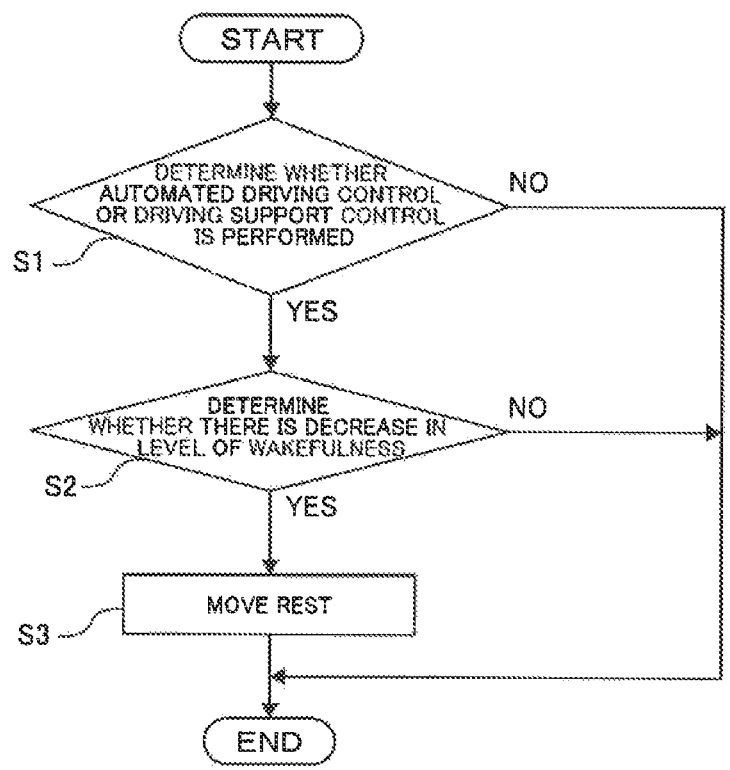
FIG. 2 is a flowchart illustrating a process of control to move a rest of the passenger wake-up apparatus illustrated in FIG. 1.
Figure 3:
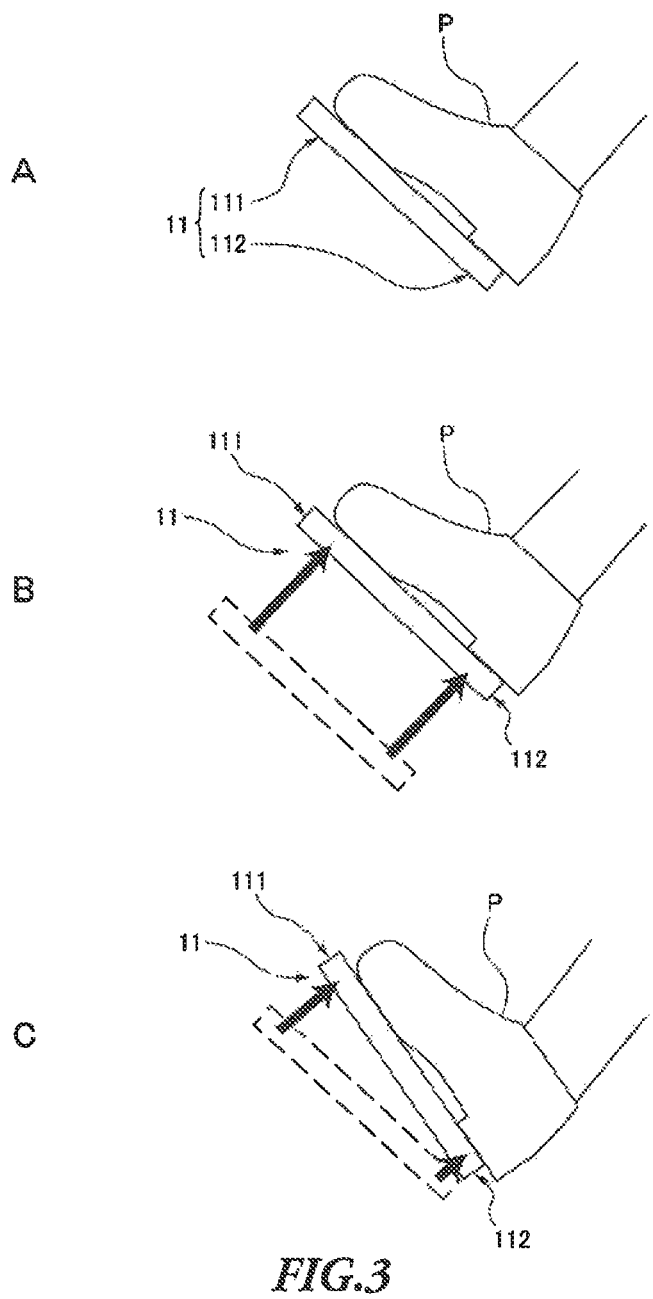
FIG. 3 is a schematic view illustrating the movement of the rest of the passenger wake-up apparatus illustrated in FIG. 1.

FIG. 1 is a schematic view illustrating a passenger wake-up apparatus 1 according to an example of the present invention. FIG. 2 is a flowchart illustrating a process of control to move a rest 11 of the passenger wake-up apparatus 1 illustrated in FIG. 1. FIG. 3 is a schematic view illustrating the movement of the rest 11 of the passenger wake-up apparatus 1 illustrated in FIG. 1.

As illustrated in FIG. 1, the passenger wake-up apparatus 1 includes a rest 11 and a driving unit 12. A vehicle equipped with the passenger wake-up apparatus 1 includes a detector 2 and a driving controller 3.

As illustrated in FIG. 1, a passenger P can put a foot on the rest 11. The rest 11 may be a member as long as the rest 11 can be provided under the feet of the passenger. The rest 11 may be, for example, an accelerator pedal, a brake pedal, a clutch pedal, a footrest, and an ottoman which can support the feet of the passenger, in particular, even the bottoms of the feet. Here, with the present example, when the rest 11 is an accelerator pedal, a brake pedal or a clutch pedal which is involved in driving a vehicle, it is preferred that the driving operation is controlled or the rest 11 has a structure to assure the safety. To be more specific, during the automated driving control or the driving support control of the vehicle, it is preferred that even though the passenger steps on the pedal or stops stepping on the pedal, as one operation to drive the vehicle, the operation is cancelled, or it is preferred that the rest 11 is fixed to disable the pedaling except when the rest 11 is moved by the driving unit 12.

The driving unit 12 may move the rest 11 under a predetermined condition. The driving unit 12 can move the rest 11 to push both feet of the passenger P. The driving unit 12 may be, for example, an electric actuator, a hydraulic cylinder, and a gas-pressure cylinder as long as it is possible to apply a force to the rest 11 to move the rest 11. The predetermined condition to move the rest 11 will be described later with reference to FIG. 2.

The detector 2 detects at least the state of the passenger P. The detector 2 may detect, for example, the level of wakefulness, the constitution of the body, the direction of the eyes, and the eye level, as the state of the passenger P. As the detector 2, various sensors and a camera may be used.

The driving controller 3 performs the automated driving control and the driving support control of the vehicle by which all or most initiative to increase and decrease the speed and to steer the vehicle is passed to the vehicle side. Basically, the automated driving control and the driving support control performed by the driving controller 3 are categorized into a plurality of driving control levels, depending on a degree of the initiative. The driving controller 3 may change the driving control level depending on a surrounding environment and so forth. With the present example, the driving controller 3 creates and updates a running scenario depending on the surrounding environment changing over time. Here, the detector 2 may detect information on the surrounding environment to create the running scenario. As the driving controller 3, an arithmetic processing unit used in a common automated driving vehicle or driving support vehicle may be used.

Now, the process of moving the rest 11 by using the components illustrated in FIG. 1 will be described with reference to the flowchart illustrated in FIG. 2.

First, the driving unit 12 determines whether the automated driving control or the driving support control is performed, based on a signal indicating the control mode of the vehicle outputted from the driving controller 3 according to the result of the detection by the detector 2 (step S1). In the step S1, when the driving controller 3 inputs the signal indicating the automated driving control mode or the driving support control mode of the vehicle to an appropriate member to drive the vehicle, the step moves to the next step (step S1/YES). On the other hand, when this signal is not inputted, or when a signal indicating a non-automated driving control mode or a non-driving support control mode is inputted, the process ends (step S1/NO). Here, in this process, the driving unit 12 performs a plurality of steps of the determination, but this is by no means limiting. The driving unit 12 according to the present invention may be an appropriate arithmetic processing member provided in an automated driving vehicle or a driving support vehicle as long as the member can make a determination by comparing and reviewing parameters including the results of detection or calculation. Alternatively, for example, a driving control member capable of outputting a signal indicating the movement of the rest 11 and a determination member that mainly makes determinations may be separately provided as the driving unit 12.

Next, the driving unit 12 determines whether the driving controller 3 performs the automated driving control or the driving support control of the vehicle, and whether there is a decrease in the level of wakefulness of the passenger P (step S2). In the step S2, when the driving unit 12 determines that there is a decrease in the level of wakefulness of the passenger P based on the result of the detection by the detector 2, the step moves to the next step (step S2/YES). On the other hand, when the driving unit 12 determines that there is no decrease in the level of wakefulness of the passenger P, the process ends (step S2/NO).

Here, the level of wakefulness of the passenger P, which is used as a parameter, may be derived from the result of the detection by the detector 2, which is, for example, information about a decrease in concentration to watch the surrounding environment, and the level of the parameter. To be more specific, the wakefulness may be derived as levels by quantifying information on the sleepiness of the passenger P detected by the detector 2 such as a car-mounted camera, and information on how often or how long the passenger monitors the surrounding of the vehicle. Examples of signs of a decrease in the level of wakefulness of the passenger P may include sluggish movements, an increase in the blink frequency, an increase in the period of time for which the passenger P closes the eyelids, frequent yawning, an increase in the body temperature, and the body swaying back and forth. These signs can be detected by the detector 2 such as a car-mounted camera, a temperature sensor disposed in the steering or the seat, and a pressure-sensitive sensor capable of detecting a pressure distribution on the surface of the seat.

In the step S2, the driving unit 12 can determine whether there is a decrease in the level of wakefulness of the passenger P, which has been derived from the quantification by the detector 2 or the driving unit 12, by comparing a predetermined threshold of the level of wakefulness with the derived actual wakefulness of the passenger P. The threshold of the wakefulness can be appropriately set by previously measuring, accumulating and analyzing the level of wakefulness as data, which is required to keep the manual driving of the passenger P safe when the initiative of the driving is passed from the vehicle driven in the automated driving mode or the driving support mode to the passenger P.

When determining that the detected or derived level of wakefulness of the passenger P is lower than the threshold (step S2/YES), the driving unit 12 outputs a driving signal to the rest 11 to move the rest 11 (step S3). In the step S3, both feet of the passenger are pushed to the passenger P side by moving the rest 11.

When the driving controller 3 performs the automated driving control or the driving support control of the vehicle, the passenger P is not driving the vehicle but is required to watch the surrounding of the vehicle in preparation for the return of the initiative of the driving from the vehicle to the passenger P. However, the need for the passenger P to watch the surrounding of the vehicle reduces because the passenger P is not driving, and therefore the passenger P tends to decrease the concentration to watch the surrounding of the vehicle. This may cause a decrease in the level of wakefulness.

Usually, the upper body of the passenger P with the decrease in the level of wakefulness cannot maintain a sense of balance, and therefore the upper body may sway. In order to recover the sense of balance by preventing or solving the body sway, it is preferable to support the body of the passenger. The sense of balance may be recovered if the head or the upper body of the passenger can be supported. However, it is difficult to support the head or the upper body of the passenger P under the condition that there is a possibility of passing the initiative of the driving from the vehicle to the passenger P.

With the present example, by moving the rest 11 to push the feet of the passenger P, the entire bottoms of the feet on which relatively many nerves are concentrated are stimulated. By this means, it is possible to effectively recover the sense of balance of the passenger P. In addition, by pushing both feet of the passenger P, it is possible to effectively prevent or solve the body sway of the passenger P. As a result, it is possible to recover the sense of the balance of the passenger P, and therefore promote the wakefulness of the passenger P. Moreover, the passenger wake-up apparatus 1 can more reliably waken the passenger P with a simpler configuration than ever.

The automated driving control and the driving support control of the vehicle include coping control to avoid a risk factor caused by various objects such as another vehicle running in front of the vehicle and obstacles, and normal running control to drive the vehicle in a normal driving mode when there is no or a little risk factor to be avoided and therefore the coping control is not required. Here, the risk factor is determined as an object which makes it impossible to maintain the safe driving unless the risk factor is avoided when the surrounding environment is also a target to be detected by the detector 2.

The passenger wake-up apparatus 1 according to the present example is used while the automated driving control or the driving support control of the vehicle is performed. In particular, the passenger wake-up apparatus 1 is preferably used while the normal running control is performed where the level of wakefulness of the passenger P tends to decrease because the surrounding environment does not change very much.

When an appropriate sensor or camera detects an object such as another vehicle and an obstacle in front of the vehicle, the coping control to avoid the object is required, for example, by increasing or decreasing the speed or steering the vehicle. In consideration of the possibility that the vehicle side passes the initiative of the driving to the passenger side in an emergency, if the wakefulness of the passenger P has not been promoted until an object approaches the vehicle and then the coping control is performed, it may be too late for the passenger P manually driving the vehicle to avoid the object. Therefore, the passenger wake-up apparatus 1 according to the present invention promotes the wakefulness of the passenger P by moving the rest 11 in the normal running control mode, and therefore the passenger P can prepare for a situation for which the coping control is required.

Here, with the present invention, the rest 11 may be moved when an object to be avoided by the coping control is detected, or when the coping control is performed. By this means, it is possible to waken the passenger P under the condition that the passenger should pay attention to the surrounding environment more than when the normal driving control is performed, and to encourage the passenger to watch the surrounding environment.

When the coping control including emergency avoidance is incorporated into the running scenario, or when the coping control including the emergency avoidance starts, it is preferred that a control performed to forcibly cancel to move the rest 11 is overwritten on the control performed by the passenger wake-up apparatus 1 according to the present invention. To be more specific, when the coping control is required, or performed, it is preferred that the rest 11 is returned to the default position if the rest 11 is being moved or has been moved, and the rest 11 is maintained in the default position if the rest 1 has not been moved. By this means, the position of the rest 11, that is, the position of the feet of the passenger P in the front-to-back direction, is returned to the position which is the same as when the passenger P puts the feet on the rest 11. Therefore, when the initiative of the driving is passed to the passenger P, it is possible to smoothly transfer the driving to the manual driving such as increasing or decreasing the speed of the vehicle by using the feet of the passenger P without a feeling of strangeness, and to prevent the passenger P from failing to step on the rest 11. When the coping control including the emergency avoidance is required while an object to be avoided is detected or the coping control is performed, the coping control including the emergency avoidance should be prioritized in view of the safety. In this case, it is preferred that the control to forcibly cancel to move the rest 11 is overwritten on the control currently performed.

In the process illustrated in FIG. 2, whether there is a decrease in the level of wakefulness of the passenger P is determined by comparing the threshold of the level of wakefulness with the actual level of wakefulness of the passenger P. However, this is by no means limiting. With the present invention, the level of wakefulness of the passenger P which is directly detected or derived may not necessarily be used, but the driving unit 12 may perform the control based on an estimated level of wakefulness. To be more specific, in a case in which the engine or the motor of the vehicle is started while the vehicle is driven in the automated driving mode or the driving support mode, if no driving operation such as increasing or decreasing the speed and steering is inputted within a specified period of time, or if the frequency at which the driving operation is inputted is lower than a predetermined frequency, it may be understood that there is a decrease in the level of wakefulness of the passenger P.

With the example illustrated in FIGS. 1 and 2, the rest 11 is moved to push the feet of the passenger P. When the rest 11 is an accelerator pedal, a brake pedal, or a clutch pedal, which is a driving member of the vehicle, it is preferred that the driving controller 3 can stably maintain the driving control of the vehicle even though the rest 11 is moved. To be more specific, the movement of the rest 11 may be separated from the operation by using the rest 11 to increase or decrease in the speed, and the operation to increase or decrease the speed which is inputted by moving the rest 11 may be cancelled.

Next, the movement of the rest 11 will be described with reference to FIG. 3. FIG. 3A illustrates the rest 11 before being moved, and FIG. 3B and FIG. 3C illustrate the rest 11 being moved in different ways.

As illustrated in FIG. 3A, the rest 11 includes a first rest part 111 that can contact the bottom of a foot of the passenger P from the position under the ankle bone to the toe side, and a second rest part 112 that can contact the bottom of the foot of the passenger P on the heel side.

As illustrated in FIG. 3B, the rest 11 may be moved such that the moving distance and the moving direction of the first rest part 111 are approximately the same as those of the second rest part 112, as indicated by black arrows, that is, the rest 11 may be translated.

Alternatively, as illustrated in FIG. 3C, the rest 11 may be moved such that the moving direction of the first rest part 111 is approximately the same as that of the second rest part 112, but the moving distance of the first rest part 111 is greater than that of the second rest part 112, that is, the rest part 111 is raised and rotates with respect to the second rest part 112 side.

As illustrated in both of FIGS. 3B, and 3C, the rest 11 can be moved to push the bottom of the foot of the passenger P to the passenger side. Moreover, the movement of the rest 11 reduces at least one of an angle of the ankle between the shin and the instep, and an angle of the knee between the thigh and the shin of the passenger P. By moving the rest 11 toward the back and the top of the vehicle, the angle of, in particular, the ankle or the knee tend to be reduced. By this means, it is possible to assure that the passenger P perceives that the foot is pushed, and therefore to promote the wakefulness of the passenger P by stimulating the bottom of the foot to recover the sense of the balance of the passenger P.

Next, to promote the wakefulness of the passenger P, a modification will be described. With the modification, the passenger wake-up apparatus 1 may include an adjustor configured to adjust at least one of a sound and a visual indication provided to the passenger P. This adjustor may be a control member configured to control the volume and the quality of a sound produced by a car audio, a navigation system, and other members that produce a notification sound. In addition, the adjustor may be a control member configured to control the visual indication of a lamp or a display panel to notify the passenger P of various information. This adjuster may be provided in an existing vehicle.

It is preferred that the adjustor adjusts at least one of the sound and the visual indication to promote the wakefulness of the passenger P while or after the driving unit 12 moves the rest 11. It is preferred that the adjuster adjusts the sound and the visual indication while a detector and so forth detects a change in the level of wakefulness of the passenger P. The sound to promote the wakefulness of the passenger P may be adjusted, for example, by increasing the volume to a level higher than usual, by gradually increasing the volume, and by gradually decreasing the volume higher than usual. The visual indication to promote the wakefulness of the passenger P may be adjusted, for example, by changing the position of the indication, by changing the brightness or the color of the indication, and by gradually changing the brightness or the color of the indication.

It is possible to promote the wakefulness of the passenger P by pushing the feet of the passenger P, and to realize the entire environment in the vehicle compartment that can promote the wakefulness of the passenger P by adjusting the sound and the visual indication by using the adjustor. Therefore, it is possible to reliably waken the passenger.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A passenger wake-up apparatus for use in a vehicle, the vehicle comprising a detector configured to detect a state of a passenger, and the vehicle being capable of automated driving control or driving support control based on a result of detection by the detector, the passenger wake-up apparatus comprising:
   a rest on which the passenger can put a foot; and
   a driving unit configured to be able to move the rest,
   wherein when determining that there is a decrease in a level of wakefulness of the passenger on a basis of a result of the detection by the detector, the driving unit moves the rest to push the foot of the passenger, while the automated driving control or the driving support control of the vehicle is performed.

2. The passenger wake-up apparatus according to claim 1, wherein the driving unit moves the rest to push both feet of the passenger.

3. The passenger wake-up apparatus according to claim 1, wherein the driving unit moves the rest in a direction in which at least one of an angle of an ankle and an angle of a knee of the passenger is reduced.

4. The passenger wake-up apparatus according to claim 2, wherein the driving unit moves the rest in a direction in which at least one of an angle of an ankle and an angle of a knee of the passenger is reduced.

5. The passenger wake-up apparatus according to claim 1, wherein:
   the rest comprises a first rest part and a second rest part, the first rest part being capable of contacting a bottom of the feet of the passenger from a position under an ankle bone to a toe side, and the second rest part being capable of contacting the bottom of the feet on a heel side; and
   the driving unit moves the rest such that a moving distance and a moving direction of the first rest part are approximately the same as those of the second rest part, or such that the moving direction of the first rest part is approximately the same as that of the second rest part but the moving distance of the first rest part is greater than that of the second rest part.

6. The passenger wake-up apparatus according to claim 2, wherein:
   the rest comprises a first rest part and a second rest part, the first rest part being capable of contacting a bottom of the feet of the passenger from a position under an ankle bone to a toe side, and the second rest part being capable of contacting the bottom of the feet on a heel side; and
   the driving unit moves the rest such that a moving distance and a moving direction of the first rest part are approximately the same as those of the second rest part, or such that the moving direction of the first rest part is approximately the same as that of the second rest part but the moving distance of the first rest part is greater than that of the second rest part.

7. The passenger wake-up apparatus according to claim 3, wherein:
   the rest comprises a first rest part and a second rest part, the first rest part being capable of contacting a bottom of the feet of the passenger from a position under an ankle bone to a toe side, and the second rest part being capable of contacting the bottom of the feet on a heel side; and
   the driving unit moves the rest such that a moving distance and a moving direction of the first rest part are approximately the same as those of the second rest part, or such that the moving direction of the first rest part is approximately the same as that of the second rest part but the moving distance of the first rest part is greater than that of the second rest part.

8. The passenger wake-up apparatus according to claim 4, wherein:
   the rest comprises a first rest part and a second rest part, the first rest part being capable of contacting a bottom of the feet of the passenger from a position under an ankle bone to a toe side, and the second rest part being capable of contacting the bottom of the feet on a heel side; and
   the driving unit moves the rest such that a moving distance and a moving direction of the first rest part are approximately the same as those of the second rest part, or such that the moving direction of the first rest part is approximately the same as that of the second rest part but the moving distance of the first rest part is greater than that of the second rest part.

9. The passenger wake-up apparatus according to claim 1, further comprising an adjustor configured to adjust at least one of a sound and a visual indication provided to the passenger,
   wherein the adjustor adjusts at least one of the sound and the visual indication to promote the wakefulness of the passenger when or after the driving unit moves the rest.

10. The passenger wake-up apparatus according to claim 2, further comprising an adjustor configured to adjust at least one of a sound and a visual indication provided to the passenger,
    wherein the adjustor adjusts at least one of the sound and the visual indication to promote the wakefulness of the passenger when or after the driving unit moves the rest.

11. The passenger wake-up apparatus according to claim 3, further comprising an adjustor configured to adjust at least one of a sound and a visual indication provided to the passenger, wherein the adjustor adjusts at least one of the sound and the visual indication to promote the wakefulness of the passenger when or after the driving unit moves the rest.

12. The passenger wake-up apparatus according to claim 4, further comprising an adjustor configured to adjust at least one of a sound and a visual indication provided to the passenger, wherein the adjustor adjusts at least one of the sound and the visual indication to promote the wakefulness of the passenger when or after the driving unit moves the rest.

13. The passenger wake-up apparatus according to claim 5, further comprising an adjustor configured to adjust at least one of a sound and a visual indication provided to the passenger, wherein the adjustor adjusts at least one of the sound and the visual indication to promote the wakefulness of the passenger when or after the driving unit moves the rest.

14. The passenger wake-up apparatus according to claim 6, further comprising an adjustor configured to adjust at least one of a sound and a visual indication provided to the passenger, wherein the adjustor adjusts at least one of the sound and the visual indication to promote the wakefulness of the passenger when or after the driving unit moves the rest.

15. The passenger wake-up apparatus according to claim 7, further comprising an adjustor configured to adjust at least one of a sound and a visual indication provided to the passenger, wherein the adjustor adjusts at least one of the sound and the visual indication to promote the wakefulness of the passenger when or after the driving unit moves the rest.

16. The passenger wake-up apparatus according to claim 8, further comprising an adjustor configured to adjust at least one of a sound and a visual indication provided to the passenger, wherein the adjustor adjusts at least one of the sound and the visual indication to promote the wakefulness of the passenger when or after the driving unit moves the rest.

* * * * *